United States Patent
Kirk

(10) Patent No.: US 9,038,660 B2
(45) Date of Patent: May 26, 2015

(54) NON-RETURN VALVE ASSEMBLY OF THE PIVOTING FLAP TYPE, TYPICALLY FOR INSERTION IN FLOOR DRAINS

(76) Inventor: Lyn Kirk, Artarmon (AU)

( * ) Notice: Subject to any disclaimer, the term of this patent is extended or adjusted under 35 U.S.C. 154(b) by 159 days.

(21) Appl. No.: 13/502,429

(22) PCT Filed: Oct. 22, 2010

(86) PCT No.: PCT/AU2010/001408
§ 371 (c)(1),
(2), (4) Date: Jun. 4, 2012

(87) PCT Pub. No.: WO2011/047437
PCT Pub. Date: Apr. 28, 2011

(65) Prior Publication Data
US 2012/0241028 A1    Sep. 27, 2012

(30) Foreign Application Priority Data
Oct. 23, 2009   (AU) .................................. 2009905187

(51) Int. Cl.
*F16K 15/03*    (2006.01)
*E03F 5/042*    (2006.01)
(Continued)

(52) U.S. Cl.
CPC . *E03F 5/042* (2013.01); *E03F 7/06* (2013.01); *E03F 2005/0417* (2013.01); *F16K 15/033* (2013.01)

(58) Field of Classification Search
CPC ......... F16K 15/033; F16K 15/03; F16K 1/16; E03F 7/04; E03F 5/042; E03F 7/06; E03F 2005/0417
USPC .............. 137/527, 362, 454.2, 454.5, 315.33; 251/360
See application file for complete search history.

(56) References Cited

U.S. PATENT DOCUMENTS 168,517 A * 10/1875 Morrell .......................... 210/116
604,117 A *  5/1898 Latshaw ..................... 137/527.8
(Continued)

FOREIGN PATENT DOCUMENTS

CA     2548143 A1 * 11/2006
CN     2923846       7/2007
(Continued)

OTHER PUBLICATIONS

Raw machine translation provided by the EPO of DE4123805.*
(Continued)

*Primary Examiner* — John K Fristoe, Jr.
*Assistant Examiner* — David Colon Morales
(74) *Attorney, Agent, or Firm* — Abelman, Frayne & Schwab

(57) ABSTRACT

A valve assembly (10) is to be used in conjunction with a tubular member having an internal surface surrounding a passage into which the valve assembly is to be sealingly inserted. The valve assembly includes a tubular body (25) having a longitudinal passage and an outer surface to be located adjacent the internal surface. A seal (29) is mounted on the outer surface to engage the internal surface to sealingly connect the tubular body with the tubular member. A movable valve member (33) is movable between an open position providing for the flow of water from an upstream end to a downstream end of the passage of the tubular body and a closed position closing the passage. Resilient means, such as a spring (34) urges the valve member to the closed position. The resilient means is configured to provide for displacement of the valve member toward the open position when pressure beyond a predetermined pressure is applied upon the movable valve member.

7 Claims, 6 Drawing Sheets

(51) Int. Cl.
   *E03F 7/06*     (2006.01)
   *E03F 5/04*     (2006.01)

(56) References Cited

U.S. PATENT DOCUMENTS

| | | | |
|---|---|---|---|
| 807,417 A * | 12/1905 | Caskey | 285/106 |
| 814,788 A * | 3/1906 | Lenhart | 137/454.2 |
| 1,000,719 A * | 8/1911 | Cram | 210/117 |
| 1,770,637 A * | 7/1930 | Wagner | 137/448 |
| 1,926,759 A * | 9/1933 | Wallman | 137/454.2 |
| 2,882,923 A * | 4/1959 | Smolensky | 137/515.5 |
| 3,232,644 A * | 2/1966 | Pfeifer et al. | 285/194 |
| 4,039,004 A | 8/1977 | Luthy | |
| 4,200,230 A * | 4/1980 | Gould | 239/66 |
| 4,307,747 A * | 12/1981 | Carpentier | 137/315.01 |
| 4,564,132 A * | 1/1986 | Lloyd-Davies | 222/522 |
| 4,605,041 A * | 8/1986 | Teumer | 137/527 |
| 4,655,247 A * | 4/1987 | Westra et al. | 137/519.5 |
| 6,698,449 B2 * | 3/2004 | Hall et al. | 137/315.41 |
| 6,932,100 B2 * | 8/2005 | Martin et al. | 137/15.18 |
| 7,107,969 B2 * | 9/2006 | Norcutt et al. | 123/470 |
| 7,240,378 B2 * | 7/2007 | Long et al. | 4/252.1 |
| 2004/0049846 A1 * | 3/2004 | Cornwall | 4/679 |
| 2005/0016094 A1 | 1/2005 | Ragsdill | |

FOREIGN PATENT DOCUMENTS

| | | |
|---|---|---|
| DE | 2647273 | 4/1978 |
| DE | 4123805 | 1/1992 |
| EP | 1657373 | 5/2006 |
| GB | 2291073 | 1/1996 |
| WO | WO 01/68996 | 9/2001 |
| WO | WO 03/097949 | 11/2003 |

OTHER PUBLICATIONS

Raw machine translation provided by the EPO of EP1657373.*
Raw machine translation provided by PROQUEST of CN2923846.*
Raw Machine Translation provided by the EPO of DE4123805 ("Passavant-Werke" published on Jan. 30, 1992).*
Raw Machine Translation provided by the EPO of EP1657373 ("Kessel GmbH" published on May 17, 2006).*
Raw Machine Translation provided by PROQUEST of CN2923846 ("Liang Ying" published on Jul. 18, 2007).*

* cited by examiner

NON-RETURN VALVE ASSEMBLY OF THE PIVOTING FLAP TYPE, TYPICALLY FOR INSERTION IN FLOOR DRAINS

TECHNICAL FIELD

The present invention relates to valve assemblies and, more particularly but not exclusively, to valve assemblies for insertion in floor drains.

BACKGROUND ART

Typically, wet rooms in buildings are provided with a floor drain. The drain will include a pipe that extends through the floor with the upper end of the pipe being provided with a floor waste. The floor waste includes a tubular portion that projects into the pipe and an upper grid or grate that is generally located at floor level and through which water enters the tubular portion for delivery to the pipe.

The pipe at a position slightly below the floor waste may have an "S" bend which retains water to prevent gases passing up through the pipe to exit via the floor waste into the room.

A disadvantage of the above discussed floor waste is that, should the "S" bend become dry or be absent, the room is in direct communication with the sewer system.

DISCLOSURE OF INVENTION

It is an object of the present invention to overcome or substantially ameliorate the above disadvantage.

According to the invention there is provided a valve assembly to be used in conjunction with a tubular member having an internal surface surrounding a passage into which the valve assembly is to be sealingly inserted, the valve assembly including:

a tubular body having a longitudinal passage and an outer surface to be located adjacent the internal surface;

a seal mounted on the outer surface to engage the internal surface to sealingly connect the tubular body with the tubular member;

a movable valve member movable between an open position providing for the flow of water from an upstream end to a downstream end of the passage of the tubular body and a closed position closing the passage; and resilient means urging the valve member to the closed position, the resilient means being configured to provide for displacement of the valve member toward the open position when pressure beyond a predetermined pressure is applied upon the movable valve member.

Preferably, the tubular body is connected to an annular flange which provides a valve seat, with the movable valve member engaging the valve seat to close the passage of the body.

Preferably, the movable valve member is mounted for pivotal movement about an axis generally transverse to a longitudinal axis of the tubular body.

Preferably, the resilient means is a spring.

According to another aspect of the invention there is provided a floor waste including the tubular member into which the valve assembly is sealingly inserted, the tubular member having an upper end and a lower end, and a grate secured to the upper end beneath which the valve assembly is located.

BRIEF DESCRIPTION OF THE DRAWINGS

In order that the invention may be readily understood and put into practical effect by way of example, reference will now be made to the accompanying drawings, in which.

MODES FOR CARRYING OUT THE INVENTION

Figure 1:
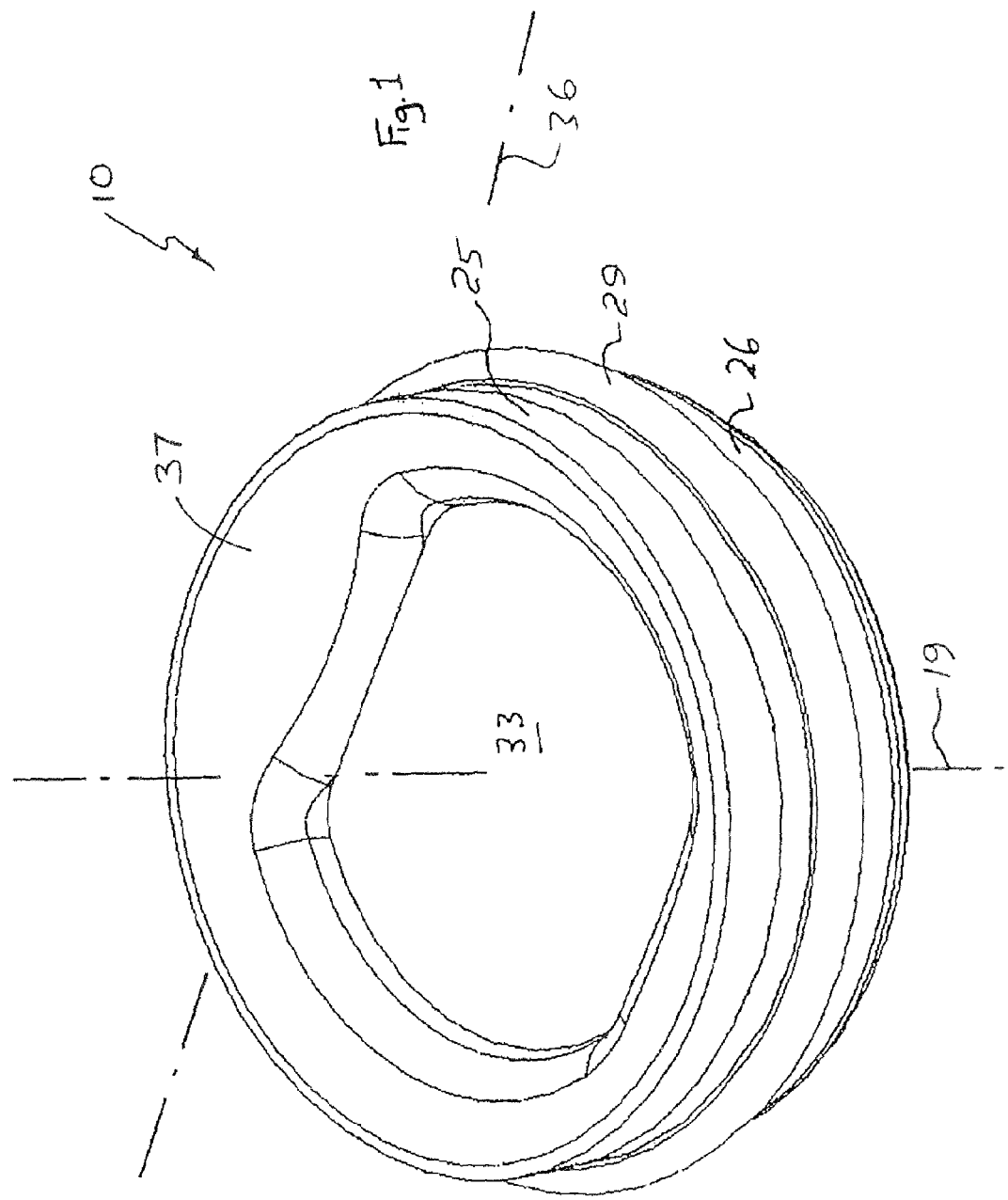
FIG. 1 is a top isometric view of a valve assembly according to a first preferred embodiment of the invention.
Figure 2:
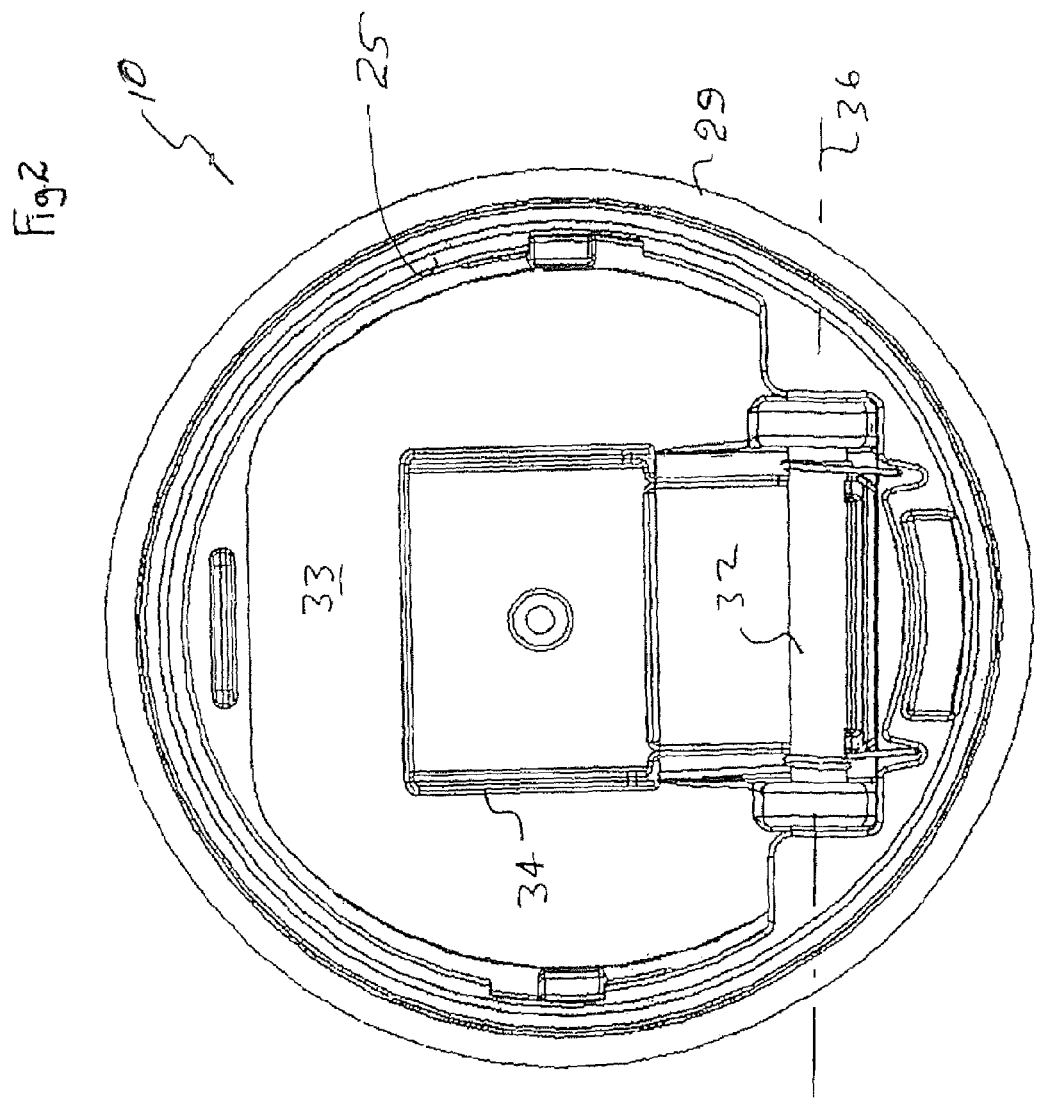
FIG. 2 is a bottom plan view of the valve assembly of FIG. 1.
Figure 3:
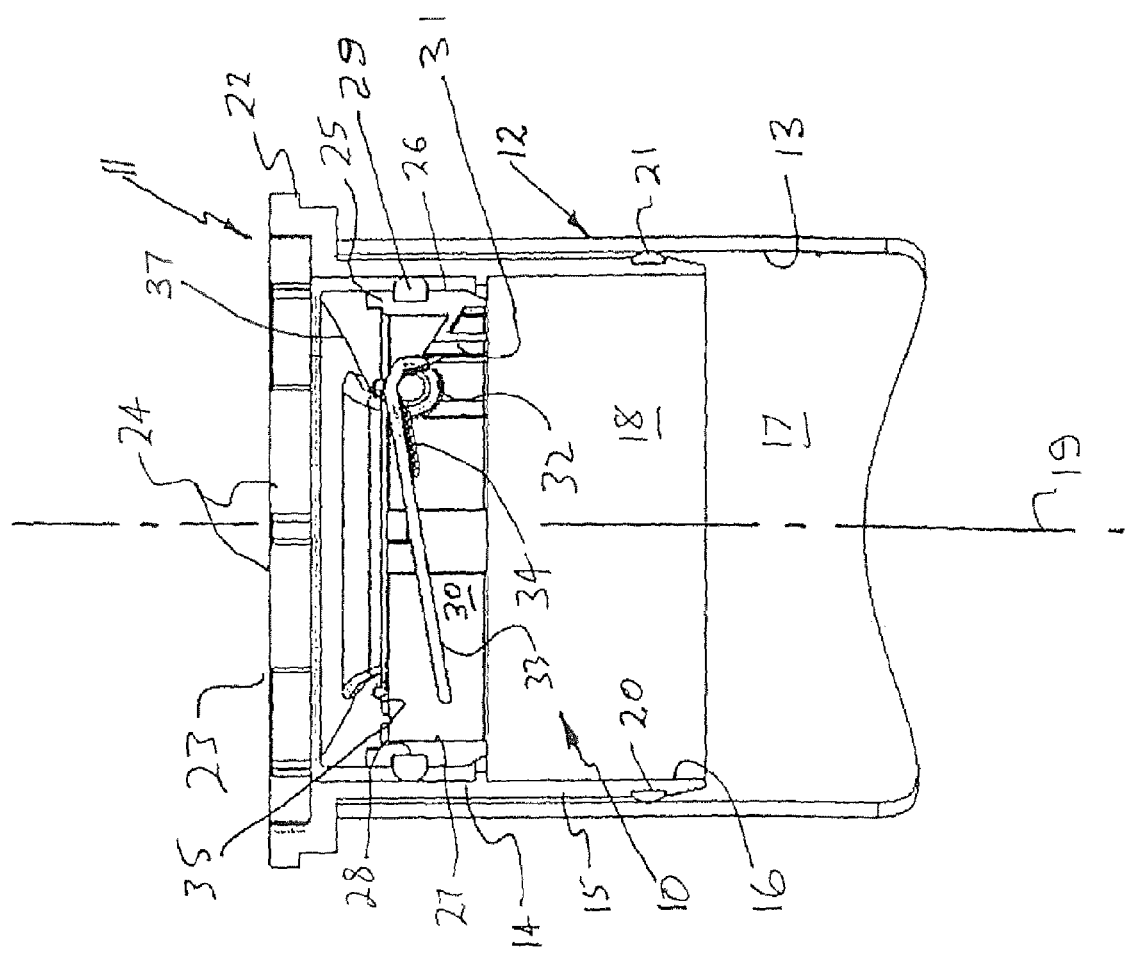
FIG. 3 is a sectioned side elevation of the valve assembly of FIGS. 1 and 2 inserted in a floor waste within a drain pipe in the floor of a building, the valve assembly being shown in an open position.

The accompanying drawings of FIGS. 1 to 3 illustrate a preferred valve assembly 10. The valve assembly 10 is inserted in a floor waste 11 that is mounted within a drain pipe 12 secured within a floor of a room in a building. The pipe 12 leads to an "S" bend connected to the sewerage system.

The pipe 12 is circular in transverse cross-section and has an internal cylindrical surface 13. The floor waste 11 includes a tubular member 14 that is of circular transverse cross-section so as to have a generally cylindrical outer surface 15 and a generally cylindrical inner surface 16.

The surface 13 surrounds a passage 17 and the cylindrical surface 16 surrounds a passage 18. The passages 17 and 18 have a common longitudinal axis 19.

The surface 15 has an annular groove 20 within which a seal 21 is located. Typically the seal 21 is of resilient material such as plastics and/or rubber. The seal 21 sealingly connects the surfaces 13 and 15.

Fixed to the upper end of the tubular member 14 is an outwardly extending flange 22 that provides a lip upon which there is mounted a grate 23. The grate 23 has a plurality of passages 24 through which water may pass.

Mounted in the floor waste 11 is the valve assembly 10. The valve assembly 10 includes a tubular body 25. The body 25 is of a generally circular transverse cross-section so as to provide a generally cylindrical outer surface 26 and inner surface 27. The surface 26 has an annular groove 28 within which is mounted a seal 29. The seal 29 is formed of resilient material such as plastics and/or rubber and is compressed against the surface 16 so as to sealingly connect the tubular body 25 and the tubular member 14.

The surface 27 surrounds a passage 30 also having the longitudinal axis 19.

The body 25 is formed with a mounting arrangement 31. The mounting arrangement 31 co-operates with a pivot assembly 32 supporting a movable valve member 33 for pivoting or angular movement about a generally horizontal axis 36, that is an axis generally transverse to the axis 19 but displaced therefrom.

A resilient means in the form of a spring 34 extends between the valve member 33 and mounting arrangement 31 to urge the valve member 33 to engage a valve seat 35 of the body 25. An alternative resilient means may comprise a counter-weight, or the valve member itself may be counter-weighted to perform the same function. When the movable valve member 33 is engaged with the seat 35, the passage 18 is closed.

The seat 35 is provided at the underside of an annular flange 37 fixed to the tubular body 25.

In operation of the above described valve assembly 10, when water passes through the passages 24 and rests on the valve member 33, pressure is applied to the valve member 33. When the pressure exceeds a predetermined pressure, the valve member 33 is moved away from the seat 35 to an open position permitting the water to pass through the passage 30 to enter the passage 18 and then the passage 17. When no such water is present, the valve member 33 is engaged with the seat 35 to prevent gasses, including odour causing air, passing from the passage 17 to the passages 24.

Preferably, the tubular member 14 of the floor waste 11, the tubular body 25 of the valve assembly 10, and the grate 23 are moulded from plastics material.

When assembling, the floor waste 11 is inserted in the pipe 12 by sliding the seal 21 down the surface 13. The valve assembly 10 is inserted in the floor waste 11 by sliding the seal 29 down the surface 16 and then locating the grate 23 on the flange 22.

Figure 4:
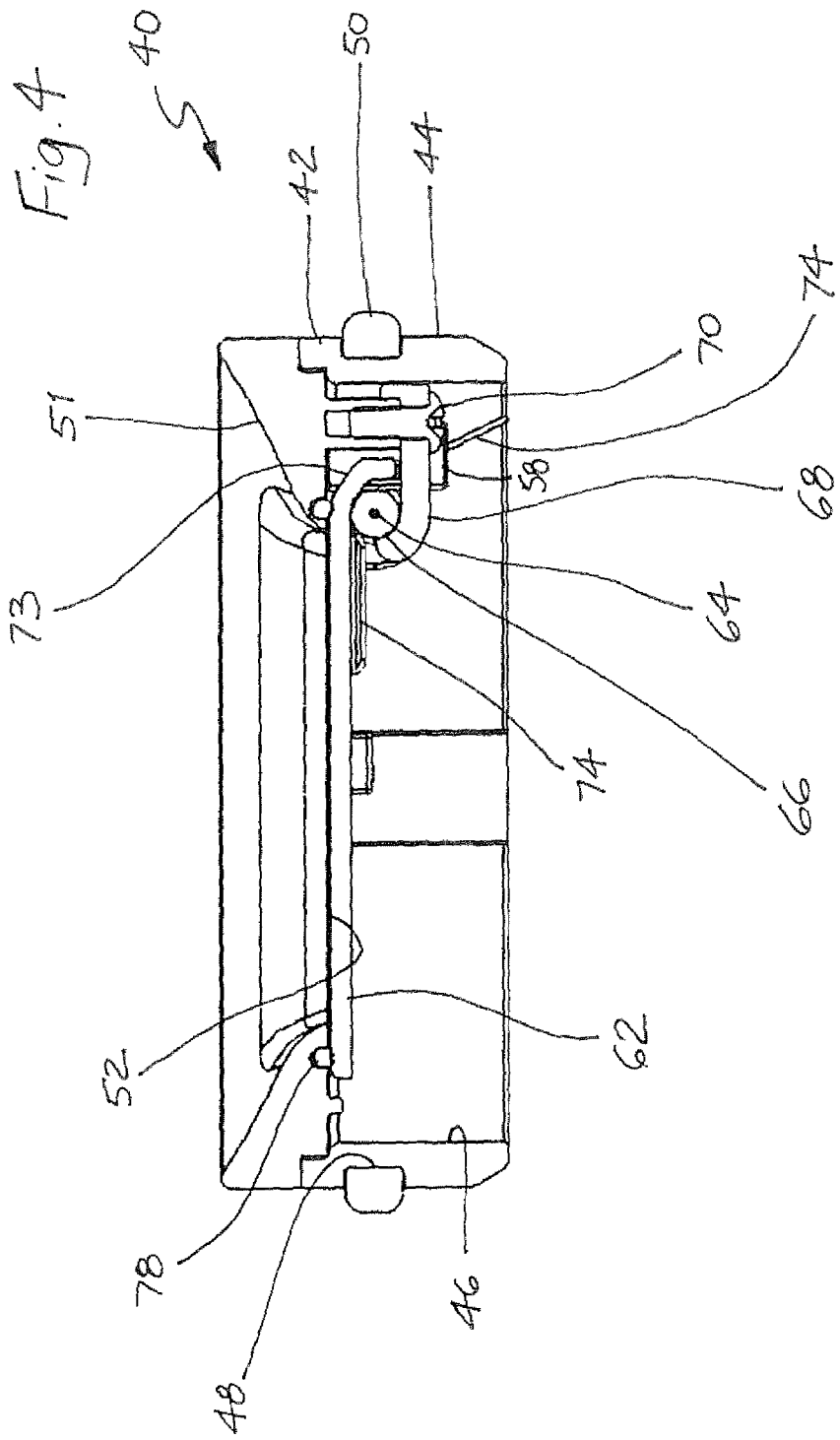
FIG. 4 is a sectioned side elevation of a valve assembly according to a second preferred embodiment of the invention, the valve assembly being shown in a closed position.
Figure 5:
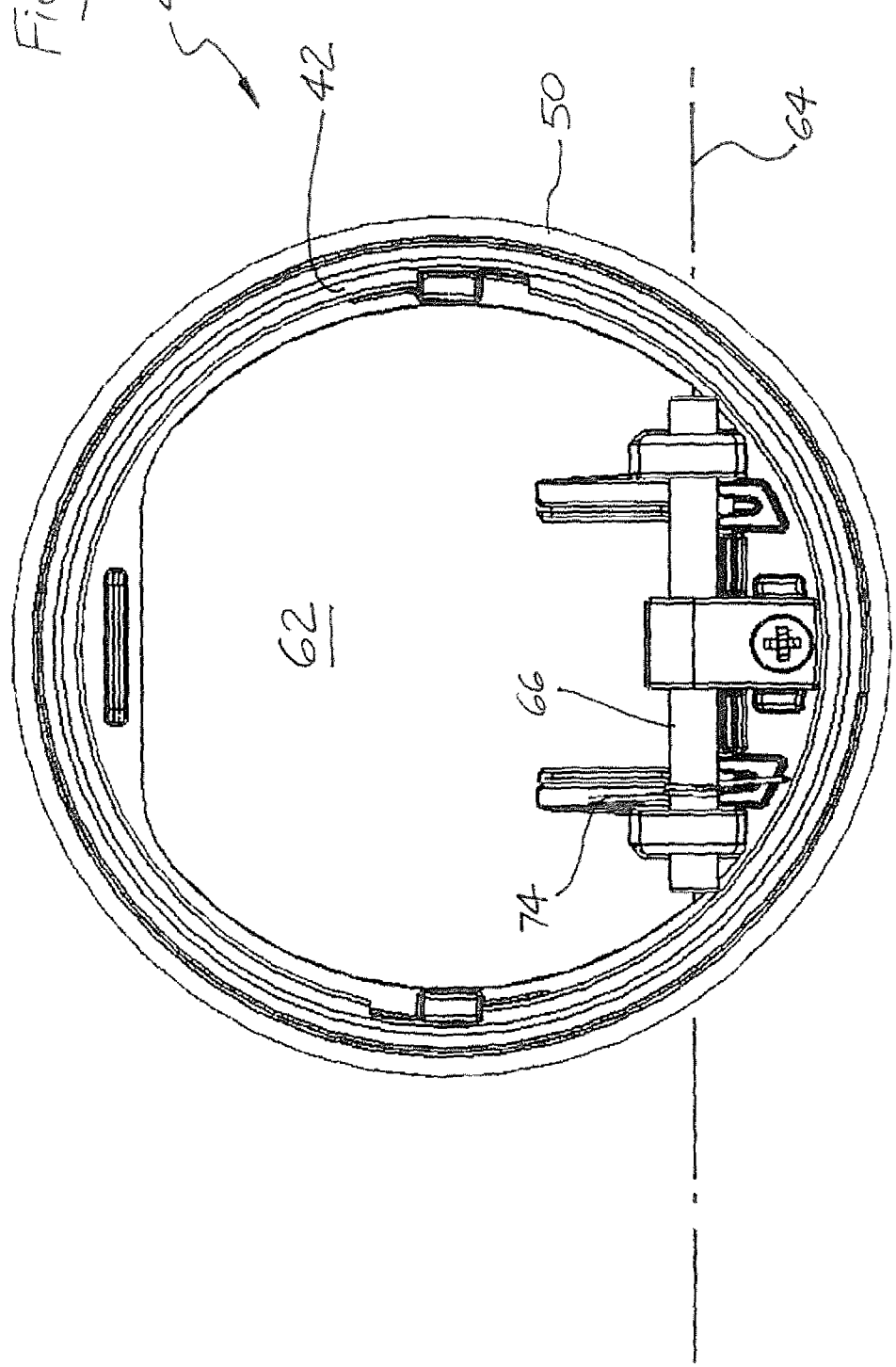
FIG. 5 is a bottom plan view of the valve assembly of FIG. 4.
Figure 6:
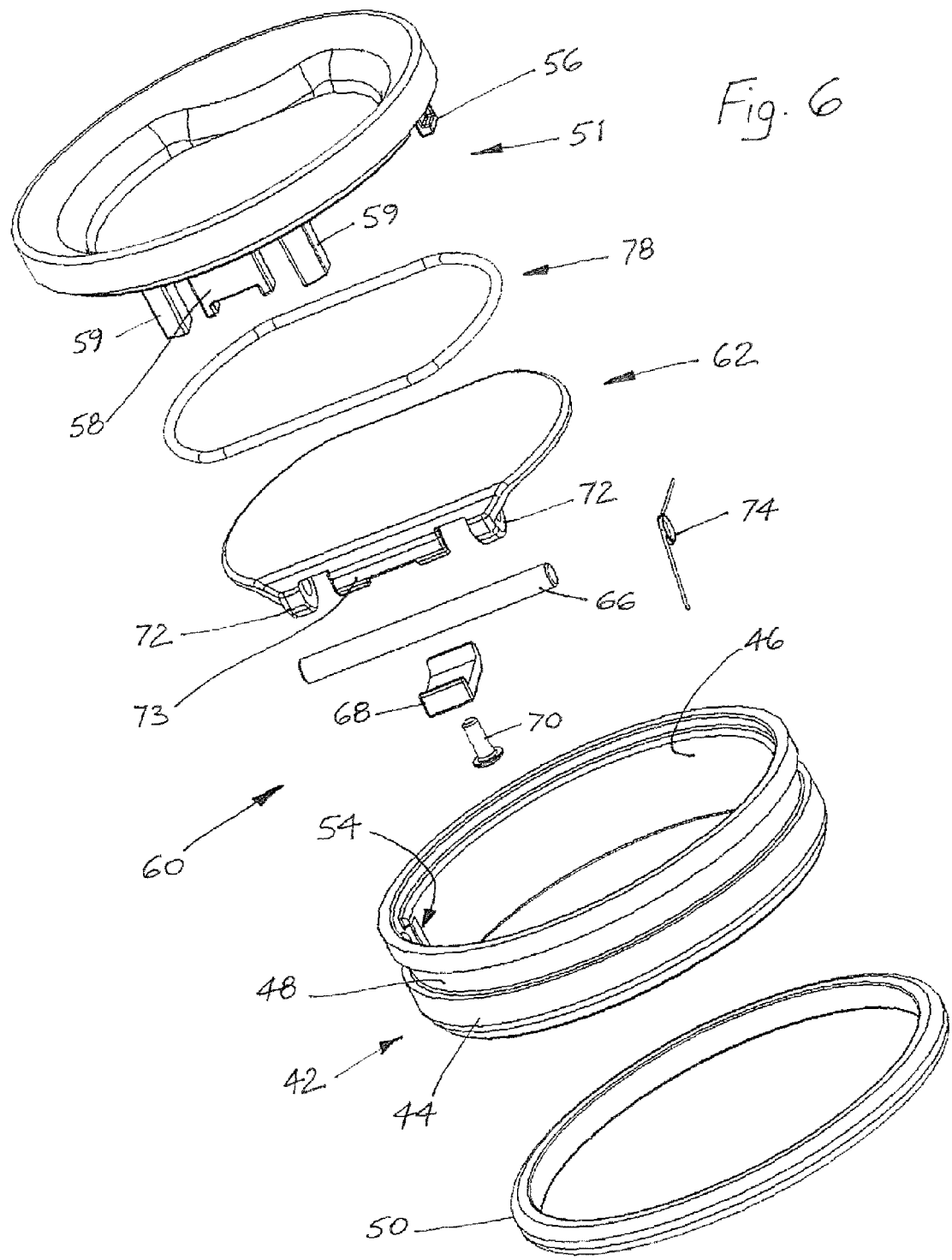
FIG. 6 is an exploded isometric view of the valve assembly of FIGS. 4 and 5.

Another preferred valve assembly 40 is illustrated in FIGS. 4 to 6. The valve assembly 40 is, in use, inserted in a floor waste that is mounted within a drain pipe of a floor of a room in a building in the manner as described above with reference to the valve assembly 10.

The valve assembly 40 has a tubular body 42 which is of a generally circular transverse cross-section so as to provide a generally cylindrical outer surface 44 and inner surface 46. The outer surface 44 has an annular groove 48 within which is mounted a seal 50. The seal 50 is formed of resilient material and is compressed against an inner surface of the floor waste so as to sealingly connect the tubular body 42 and the generally cylindrical inner surface of the floor waste.

Mounted upon the body 42 is an annular flange 51 which provides a valve seat 52. The inner surface 46 of the body 42 is formed with a pair of oppositely disposed guide slots 54 to engage correspondingly positioned guide members 56 formed on the annular flange 51. The guide members 56 engage the guide slots 54 by an insert and twist locking action.

The annular flange 51 is formed with a mounting arrangement comprising a mounting block 58 and a pair of mounting stems 59. The mounting block 58 co-operates with a pivot assembly 60 supporting a movable valve member 62 for pivoting or angular movement about a generally horizontal axis 64. The axis 64 is an axis generally transverse to, but disposed from, a common vertical axis through the central passages of the floor waste and the drain pipe.

The pivot assembly 60 includes a pivot rod 66, clamp bracket 68 and clamp screw 70, with the pivot rod 66 engaged at its opposite ends through a pair of pivot rings 72 formed on the movable valve member 62. A middle portion of the pivot rod 66 is engaged to a pivot flange 73 of the valve member 62 via the clamp bracket 68 and clamp screw 70. Alternatively, the separate components 68, 70 may be in a single moulded form.

A resilient spring 74 extends between the underside of the valve member 62 and a mounting stem 59 extending downwardly from the annular flange 51 to urge the valve member 62 to engage the valve seat 52. The valve seat 52 includes a seal 78 to sealingly connect the valve member 62 and the annular flange 51, thereby closing the passage through the floor waste.

In use, when water flows onto the valve member 62 and applies a pressure thereon that exceeds a predetermined pressure based, at least in part, on the nature of the spring 74, the valve member 62 is moved away from the seat 52 to an open position permitting the water to pass through the passages of the floor waste and drain pipe. When no such water is present, the valve member 62 is engaged with the valve seat 52 to advantageously prevent gases, including foul air, passing up through those passages into the room.

It is another advantage of the invention that it prevents microorganisms, including disease causing bacteria, and vermin such as insects, migrating from fluids in the sewer system and "infecting" the room, thereby maintaining the health of its occupants.

Yet another advantage of the invention resides in its ability to be retrofitted or installed in most existing floor drains without having to replace, or cause damage to, the grate, grate mounting flange, surrounding floor surfaces, or pipes.

It will be readily apparent to persons skilled in the art that various modifications may be made in details of design and construction of the valve assemblies described above without departing from the scope or ambit of the present invention.

The invention claimed is:

1. A valve assembly to be used in conjunction with a tubular member having an internal surface surrounding a passage into which the valve assembly is to be sealingly inserted, the valve assembly including:
   a tubular body having a longitudinal passage and an outer surface to be located adjacent the internal surface;
   a seal mounted on the outer surface to engage the internal surface to sealingly connect the tubular body with the tubular member;
   a movable valve member movable between an open position providing for the flow of water from an upstream end to a downstream end of the passage of the tubular body and a closed position closing the passage of the tubular body; and
   a resilient member urging the movable valve member to the closed position, the resilient member being configured to provide for displacement of the movable valve member toward the open position when pressure beyond a predetermined pressure is applied upon the movable valve member; and
   an annular flange coupled to the tubular body which provides a valve seat, with the movable valve member engaging the valve seat to close the passage of the tubular body, and wherein the tubular body has an inner surface formed with a pair of guide slots, and the annular flange has a pair of guide members formed to engage the guide slots by an insert and twist locking action;
   wherein the annular flange is mounted on top of the tubular body, and wherein the movable valve member is engaged to the valve seat of the annular flange by a pivot assembly supporting the movable valve member such that the movable valve member and the annular flange are pivotally interconnected and are together locked to the tubular body by the insert and twist locking action.

2. The valve assembly of claim 1, wherein the movable valve member is mounted for pivotal movement about an axis generally transverse to a longitudinal axis of the tubular body.

3. The value assembly of claim 1, wherein the resilient means is a spring.

4. The valve assembly of claim 3, wherein a mounting arrangement cooperates with a pivot assembly supporting the movable valve member.

5. The valve assembly of claim 4, wherein the spring extends between the underside of the movable valve member and the mounting arrangement to urge the movable valve member to engage the valve seat.

6. The valve assembly of claim 1, wherein the outer surface of the tubular body has an annular groove within which the seal is mounted.

7. A floor waste comprising a tubular member having an internal surface surrounding a passage, and the valve assembly of claim 1 sealingly inserted within the passage, the tubular member having an upper end and a lower end, and a grate secured to the upper end beneath which the valve assembly is located.

\* \* \* \* \*